3,284,186
HERBICIDAL COMPOSITION AND METHOD
Herbert A. Pass, St. Lambert, Quebec, and Beresford J. Watt, Valois, Quebec, Canada, assignors to The Sherwin-Williams Co. of Canada, Limited, Green Cross Division
No Drawing. Filed Feb. 27, 1964, Ser. No. 347,659
Claims priority, application Canada, Mar. 1, 1963, 869,971
18 Claims. (Cl. 71—2.6)

This invention relates to herbicidal compositions.

Methoxychlorobenzoic herbicides; (2,4-dichlorophenoxyacetic acid) 2,4-D herbicides; (2-methyl-4-chlorophenoxyacetic acid) MCP herbicides; (2-methyl-4-chlorophenoxypropionic acid) CMPP herbicides; and (2,4-dichlorophenoxypropionic acid) 2,4-DP herbicides are known to possess selective activity.

They are generally effective against certain susceptible weeds at dosages in the range of a few ounces of active substance per acre. Individually, they fail to destroy certain non-susceptible weeds at dosage rates compatible with their use on cereal crops and other grain crops. These non-susceptible weeds have become an increasingly serious problem. They are numerous and widespread and cause millions of dollars annually in crop damage and associated losses.

Examples of these non-susceptible weeds, to chlorophenoxy herbicides, for example, are: wild buckwheat, Canada thistle, smartweed (e.g. green smartweed, lady's thumb smartweed), sow thistle, hemp nettle, corn spurry, tartary buckwheat, cowcockle, etc.

Various herbicide combinations have been tried in an attempt to control these non-susceptible weeds at rates which are non-injurious for cereal crops, but in the main, the attempts have failed and the weeds continue to thrive.

*Applicants' development*

The applicants have now developed herbicidal compositions capable of being applied to grain crops at rates compatible to the crops which not only rid the crops of the weeds, but completely destroy them. The applicants' compositions control a very broad range of both susceptible and non-susceptible weeds.

The applicants' herbicidal compositions include as the essential active constituents a firs ingredient comprising a chlorophenoxyacetic herbicide selected from the group consisting of 2,4-D herbicides and MCP herbicides, a second ingredient comprising a chlorophenoxypropionic herbicide selected from the group consisting of CMPP herbicides and 2,4-DP herbicides, and a third ingredient comprising a methoxychlorobenzoic herbicide selected from the group consisting of 2-methoxy-3,6-dichlorobenzoic herbicides and 2-methoxy-3,5,6-trichlorobenzoic herbicides; is highly effective in controlling certain of the non susceptible weeds, and at the same time, exerts at least as satisfactory and even improved control over the susceptible weeds (e.g. mustard, stinkweed, etc.) as any of the named chlorophenoxyacetic or chlorophenoxypropionic herbicides. The methoxychlorobenzoic herbicides are not effective against these weeds at reasonable dosages. The applicants' compositions have the further advantageous attribute that they do not affect the growth and yield of a crop which is sprayed with the herbicidal compositions of this invention. In fact, in using the herbicides, an increased crop yield is obtainable in most cases.

Methoxychlorobenzoic herbicides embraced within the scope of this invention are 2-methoxy-3,6-dichlorobenzoic acid and 2-methoxy-3,5,6-trichlorobenzoic acid.

A particularly preferred active constituent is that marketed under the trademark "Banvel D." This is the compound having the empirical formula $C_8H_6Cl_2O_3$, 2-methoxy-3,6-dichlorobenzoic acid. The compound 2-methoxy-3,5,6-trichlorobenzoic acid is marketed under the trademark "Banvel T."

A particularly preferred composition according to this invention includes as essential active constituents, a 2,4-D herbicide, a CMPP herbicide or a 2,4-DP herbicide and the compound Banvel D.

The composition of the applicants' invention controls not only a broader range of weed species than any herbicide available heretofor, including susceptible and non-susceptible types but is unexpected because it could not have been predicted that the combination of herbicides would provide adequate control without at the same time causing phytotoxicity and resultant decreases in crop yields. Many tests for weed control in wheat, oats, etc. have shown that crop yields are substantially increased and that no adverse effect occurs when using the composition of this invention.

The herbicidal compositions of the invention are particularly effective in the cultivation of cereal crops including wheat, oats, barley, etc., as the compositions control weed infestations without injury to the crop. They are also very useful for application to turf, as well as other areas in which it is desired to control weeds.

The active substances of the applicants' herbicidal composition are made up in chemical formulations usual in this art. Thus, it will be understood by anyone skilled in this art that the terms "a 2,4-D herbicide," "a 2,4-DP herbicide," "an MCP herbicide," "a CMPP herbicide," etc., are used to denote the active substances in their various herbicidally active formulations common to this art. For example, they may be in the form of their acids, amines, amine salts, esters, and salts, etc. Also, the physical nature of the end composition may be of the various forms usual in the art. For example, dry products, for instance, dusts and granular products, and liquids, for example, solutions, dispersions or pates may be used.

Typical esters used in this art are:

(1) Alkyl esters, for example, methyl, ethyl, propyl, butyl, amyl, or octyl, their secondary forms, iso-butyl, iso-propyl, iso-octyl, and mixed esters.

(2) Low volatile esters, for example, butoxyethanol, propylene glycol butanol, 2-ethylhexanol, or butoxypropanol.

(3) Glycol esters—this term is used to denote straight-chain glycol esters, for example, propylene glycol butyl ether ester, butoxy ethyl, butoxy ethanol, dipropylene glycol esters, and butoxy ethoxy propanol ester.

Typical amines used in this art are: alkanolamine, e.g. diethanolamine, dimethylamine, triethylamine, trimethylamine, triethanolamine, iso-propylamine, diiso-propylamines, and mixed amines.

Typical salts are: sodium, potassium and lithium salts, and ammonium salts.

The acids are generally dissolved in polyethylene glycol, tributyl phosphates, or may be made up in the form of pastes, as suitable carriers.

Liquid compositions are usually formulated as esters, amines, or as herbicidally acceptable salts. These liquid products may be formulated with or without oil solvents and with or without emulsifying agents or wetting agents. In practice, they are generally diluted with water, or in an oil, before being sprayed on the crop.

The active substances may be put up in dry form, impregnated on inert carriers for dust application, as dry powders, or in solid form, as in blocks or bars (specially useful for lawns and other turf areas), pellets, granules, cakes or dry fertilizer mixes (specially useful for application to cereal crops, pastures, lawns, or other turf areas). The dry forms may be diluted with inert dry carriers, for example, talc, or may be diluted in water for spray application. Wetting agents and dispersing agents may be added to the dry forms as required, or alternately, wetting agents may be added to the liquid salt forms.

The applicants' herbicidal compositions are generally formulated so that the total amount of the active constituents of the chlorophenoxyacetic and chlorophenoxypropionic herbicides is in a ratio by weight to the methoxy-chlorobenzoic herbicide of from about 15:1 to about 1:1. Desirably, the ratio is between about 9:1 to about 1:1.

Subject to the above ratio, the chlorophenoxyacetic herbicide is generally used in a ratio by weight to the chlorophenoxypropionic herbicide, of from about ¼:1 to about 4:1, calculated on the basis of active ingredients.

A particularly preferred range is between about 3.5 to about 1.5 parts by weight of the total of the chlorophenoxyacetic and the chlorophenoxypropionic herbicides per one part of methoxychlorobenzoic herbicide, calculated on the basis of the active ingredients.

In this preferred range, the chlorophenoxyacetic herbicide is preferably used in a ratio by weight of between about ¼:1 to about 4:1 to the chlorophenoxypropionic herbicide.

It will be understood that the rates mentioned above and the rates in the following examples are expressed in terms of the active substances. Thus, for example, the compound CMPP consists of a racemic mixture of its dextro and levo isomers. However, only the dextro isomer is herbicidally active and therefore, when an amount as "X oz." is indicated, it is used to denote the amount of the active dextro isomer. In practice, the isomers are not isolated, and therefore, an amount of the racemic mixture, twice that of the dextro isomer, is used to obtain the desired amount of active substance.

The applicants' compositions, formulated as above, are usually diluted for the purposes of application to the crops and applied to the locus to be treated at a rate in the range of from about 2 oz. to about 32 oz. (a higher rate being applicable to weed treatments in non-crop land) of the total active substance by weight of the ingredients of the composition per acre.

Having thus generally described the invention, it will now be referred to by reference to the following examples illustrating preferred embodiments and methods. All measures are made on the basis of the imperial system.

EXAMPLE 1

A composition was formulated to contain the following substances, the active ingredients and amounts of which are expressed in terms of their acid equivalents.

Ingredients: Amounts, oz./gal.
2,4-dichlorophenoxyacetic acid _____ 32
2-methyl-4-chlorophenoxypropionic acid _____ 8
2-methoxy-3,6-dichlorobenzoic acid _____ 12

This formulation was diluted with a carrier and applied to different weed-infested crops at varying rates. The summary of the results of the applications (by sprayer, dusting, etc.) is shown in the following table.

Table I

| Crop | Weed | Rate of Application Per Acre,[1] (ounce) | Results |
|---|---|---|---|
| Wheat | Wild Buckwheat | 6 | Excellent control crop not affected. |
| Do | Smartweed | 4 | Excellent control, completely eradicated; crop not affected. |
| Do | Sow Thistle | 8 | Good control crop not affected. |
| Do | Red Root Pigweed | 6 | Crop not affected, weed control judged very good. |
| Oats | Sow Thistle | 10 | Control excellent, no crop damage. |

[1] Expressed in terms of ounces of acid equivalent. Thus, for example the application of 4 oz./acre of the composition of Example 1 is equivalent to approximately 0.94 oz. of 2-methoxy-3,6-dichlorobenzoic (acid eq.)/acre; and 2.44 oz. of 2,4-dichlorophenoxyacetic (acid eq.)/acre together with 0.60 oz. of 2-methyl-4-chlorophenoxypropionic (acid eq.)/acre.

Further tests using the formulation of Example 1 were carried out on barley and wheat crops, infested with green smartweed and wild buckwheat. Even using amounts as low as 4 ounces or lower of the acid equivalent of the composition of Example 1, excellent control of weeds was found, with no crop damage nor decrease in the crop yield.

The applicants' herbicidal compositions contrast with known herbicidal compositions in general in their effectiveness to eradicate weed, and require less of the active substances to be applied to the locus to preform to an equivalent degree. They also, as mentioned above, have the particularly desirable attribute that they will increase crop yields and contrast with other herbicidal compositions which merely depress, but do not kill the weeds completely.

EXAMPLE 2

The following data in Table II summarizes a series of tests carried out using a preferred herbicidal composition according to this invention compared to two other compositions.

In Table II, the cmposition A is made up of a 2,4-D herbicide (32 oz. acid equivalent), a CMPP herbicide (16 oz. acid equivalent of the active isomer) and mixed isomers of 2,4,5-T (12 oz. of acid equivalent). Composition C is made up of a 2,4-D herbicide (22 oz. acid equivalent), a CMPP herbicide (32 oz. acid equivalent of the active isomer), mixed isomers of 2,4,5-T (12 oz. acid equivalent) and a 2,4,5-TP herbicide (12 oz. acid equivalent). Composition B contains the same ingredients and amounts of the compositon in Example 1.

Also in this table, comparison is made on the basis of phytotoxicity, weed phytotoxicity being rated from 0–10 in which a rating of below 7 is unacceptable.

Table II

CONTROL OF WILD BUCKWHEAT IN WHEAT CROPS WITH DIFFERENT HERBICIDAL COMPOSITIONS

| Composition | Plot | Rate of Application Per Acre in oz. | Weed Control Rating | Crop Yield, bu./acre |
|---|---|---|---|---|
| Weedy Check (No Treatment) | | 0 | 0 | 2.96 |
| A | 1 | 4 | 4 | 9.2 |
|   | 2 | 6 | 4 | 10.18 |
|   | 3 | 8 | 5 | 7.66 |
|   | 4 | 12 | 5 | 6.00 |
|   | 5 | 16 | 5 | 9.87 |
| B | 6 | 4 | 8 | 7.25 |
|   | 7 | 6 | 9 | 8.46 |
|   | 8 | 8 | 10 | 12.57 |
|   | 9 | 12 | 10 | 12.57 |
|   | 10 | 16 | 10 | 15.12 |
| C | 11 | 4 | 2 | 7.36 |
|   | 12 | 6 | 4 | 7.88 |
|   | 13 | 8 | 3 | 7.49 |
|   | 14 | 12 | 3 | 8.38 |
|   | 15 | 16 | 5 | 6.88 |

It will be seen from the above table that the applicants' compositions are vastly superior in weed control as well as permitting full development of the crops to produce higher yields. Furthermore, the amount of the active substances of the applicants' compositions required to eradicate and prevent reoccurrence of the weeds is a greatly reduced amount compared to other compositions for accomplishing the same purpose.

EXAMPLE 3

This example illustrates the use of a preferred composition according to this invention which when compared to each of the ingredients of the composition used alone, shows an increase in weed control effectiveness. The example employed red root pigweed as the species of weed to be controlled.

The trials were carried out at Glenlea, Manitoba, in a crop of wheat. The plots in this experiment were sprayed on June 17 when the crop was in the 3 to 4 leaf stage and the weeds were mostly in the 2 to 4 leaf stage. Weed control was assessed on July 9 on the basis of "minimum dosage required for 90% control."

Composition A used in treatment number four of this example was formulated to contain the following ingredients in the following amounts (expressed in terms of their acid equivalents per gallon).

|  | Oz. |
|---|---|
| 2,4-D | 49.9 |
| CMPP | 12.5 |
| Banvel D | 17.8 |

The results of the experiments according to this example are illustrated in accompanying Table III.

Table III (Crop: Wheat)

COMPARISON OF A PREFERRED APPLICANTS' COMPOSITION TO BANVEL D, 2,4-D, CMPP ALONE
[Minimum amount of herbicide or herbicidal composition needed for 90% kill expressed in terms of amount of active ingredients per acre (acid equivalents)]

| Treatment Number | Composition | Red Root Pigweed (Amaranthus retroflexus) |
|---|---|---|
| Check | Check | |
| 1 | 2,4-D | 10.2 oz./acre. |
| 2 | CMPP (d-isomer) | 15.0 oz./acre. |
| 3 | Banvel D | 3.0 oz./acre. |
| 4 | "A" | 2.2 oz./acre. |

Thus, the 2.2 oz. of composition A applied per acre used in treatment number four actually contained the following amounts of active ingredients:

|  | Oz. |
|---|---|
| 2,4-D | 1.37 |
| CMPP | .34 |
| Banvel D | .49 |

From the above Table III, it will clearly be seen that the applicants' composition was much more effective than any one of the three herbicides which it contains is used individually. It required 10.2 oz. 2,4-D for 90% control of redroot pigweed. It required 15 oz. CMPP (di-isomer) for 90% control of redroot pigweed. It required 3 oz. Banvel D for 90% control of redroot pigweed. Yet it required only a total of 2.2 oz. of the three components in combination, which is made up of 1.37 oz. 2,4-D, 0.34 oz. CMPP and 0.49 oz. Banvel D.

EXAMPLE 4

Table IV employs wild mustard as the species of weed to be controlled.

The trials were carried out in a crop of wheat at the same location as given for redroot pigweed exemplified in Example 3. Spray and weed control assessment dates were also the same.

Composition A used in this example in treatment number four was identical with the composition formulated in Example 3.

The results of the experiments according to this example are illustrated in accompanying Table IV.

Table IV (Crop: Wheat)

COMPARISON OF A PREFERRED COMPOSITION ACCORDING TO THIS INVENTION, TO THE INDIVIDUAL INGREDIENTS BANVEL D, 2,4-D, CMPP ALONE
[Minimum amount of herbicide needed for 90% kill expressed in terms of amount of active ingredients per acre (acid equivalents)]

| Treatment Number | Composition | Wild Mustard (Brassica arvense) |
|---|---|---|
| 1 | 2,4-D | 3.2 oz./acre. |
| 2 | CMPP (d-isomer) | 2.2 oz./acre. |
| 3 | Banvel D | 21.4 oz./acre. |
| 4 | "A" | 2.2 oz./acre. |

Thus, the 2.2 oz. of active ingredients of composition A per acre needed for a 90% kill in treatment number four of Example 4 actually contain the following amounts of active ingredients:

|  | Oz. |
|---|---|
| 2,4-D | 1.37 |
| CMPP | .34 |
| Banvel D | .49 |

Table IV clearly shows that the applicants' composition was much more effective than Banvel D alone. It required approximately ten times more Banvel D alone than the amount of Banvel D in the applicants' composition to control wild mustard. Similarly, less than one seventh of the applicants' composition in terms of CMPP content was required than when using CMPP alone to control the weed. Also, only about one third of the amount of 2,4-D was required in the applicants' composition as when 2,4-D was used alone for similar control.

EXAMPLE 5

This example illustrates the results of an experiment identical to that of Example 4, using the same treatments on the same weeds, excepting applicants' composition used in treatment number four of Example 4 was formulated to contain 2,4-DP instead of CMPP and contained the following ingredients in the following amounts (expressed in terms of their acid equivalents)

|  | Oz. |
|---|---|
| 2,4-D | 32 |
| 2,4-DP | 8 |
| Banvel D | 12 |

It required exactly 2.2 oz. per acre of the above composition to control the wild mustard. This 2.2 oz. per acre thus actually contained only:

|  | Oz. |
|---|---|
| 2,4-D | 1.37 |
| 2,4-DP | .34 |
| Banvel D | .49 |

EXAMPLE 6

This example further illustrates the use of a preferred composition according to this invention, in treating lady's thumb smartweed in a wheat crop.

The results of these experiments are summarized in Table V in which composition A used in treatment number four is identical with the composition A of Example 3.

The crop and place of application, spray date, weed control assessment date of this example, were the same as in Examples 3, 4 and 5.

Table V (Crop: Wheat)

COMPARISON OF A PREFERRED COMPOSITION ACCORDING TO THIS INVENTION, TO THE INDIVIDUAL INGREDIENTS BANVEL D, 2,4-D, CMPP ALONE
[Minimum amount of herbicide needed for 90% kill expressed in terms of amount of active ingredients per acre (acid equivalents]

| Treatment Number | Composition | Smartweed (*Polygonum persicaria*) |
|---|---|---|
| 1 | 2,4-D | 11.2 oz./acre. |
| 2 | CMPP (d-isomer) | 32.0 oz./acre. |
| 3 | Banvel D | 1.4 oz./acre. |
| 4 | "A" | 2.2 oz./acre. |

Thus, the 2.2 oz. of composition A applied per acre used in treatment number four actually contained the following amounts of active ingredients:

|  | Oz. |
|---|---|
| 2,4-D | 1.37 |
| CMPP | .34 |
| Banvel D | .49 |

Table V clearly shows that the applicants' composition was much more effective than either 2,4-D or CMPP when used alone. In fact, CMPP was ineffective at the highest rate used, namely 32 oz. per acre. Only one third of the amount of Banvel D used alone was required in the applicants' composition combined with very minor amounts of 2,4-D and CMPP to give the desired degree of control.

EXAMPLE 7

The following example is presented to demonstrate the effectiveness of a preferred composition of the applicants' invention over a combination of two of the individual ingredients.

In trials conducted at Rougemont, Quebec, plots of wheat infested with weeds were sprayed on June 21 with the compositions shown in Table VI. The grain was in the four leaf stage and the weeds in the 2-4 leaf stage. Later in the season percentage weed control was ascertained for each replicate. A total of three replicates was utilized for each treatment.

Composition A used in treatment number four contains the following amounts of active ingredients at 6 oz. of acid equivalent per acre:

|  | Oz. |
|---|---|
| 2,4-D | 3.75 |
| CMPP | 0.9 |
| Banvel D | 1.35 |

Composition E, applied at an acid equivalent of 8 oz. of the active ingredients per acre, contains the following amounts of constituents:

|  | Oz. |
|---|---|
| 2,4-D | 6 |
| Banvel D | 2 |

Table VI (Crop: Wheat)

AVERAGE PERCENT CONTROL OF WEEDS SUMMARY OF 3 REPLICATES FOR EACH TREATMENT TRIALS CONDUCTED AT ROUGEMONT, QUEBEC

| Treatment Number | Total Acid Equivalent Per Acre | Composition | Percent Control |
|---|---|---|---|
| Check | 0 | Check | 0 |
| 1 | 8 oz | 2,4-D | 45.1 |
| 2 | 2 oz | Banvel D | 60.3 |
| 3 | 8 oz | "E" | 74.2 |
| 4 | 6 oz | "A" | 83.0 |

The above table shows that 6 oz. of total ingredients per acre of applicants' composition A gave 83% control of weeds in the crop, whereas 8 oz. of total ingredients per acre of applicants' composition E not only failed to achieve equivalent weed control but was statistically significantly less effective with only 74.2% weed control.

In this respect, it will also be observed that the total dosage in the applicants' composition is 25% less than composition E which contained 8 oz. of total active ingredients per acre.

EXAMPLE 8

This example illustrates the superior herbicidal activity of the applicants' composition in controlling smartweed in a crop of wheat in comparison to two of the active ingredients of applicants' composition either alone or in admixture, namely 2,4-D and CMPP.

A wheat field at Glenlea, Manitoba, was treated on June 17 when the crop was in the 3 to 4 leaf stage. Weed control was assessed on the basis of minimum dosage required for 90% control of July 9. The results are shown in Table VII.

Table VII (Crop: Wheat)

MINIMUM RATE OF HERBICIDE NEEDED FOR 90% CONTROL EXPRESSED IN TERMS OF AMOUNT OF ACTIVE INGREDIENTS PER ACRE (ACID EQUIVALENTS)

| Treatment Number | Composition | Smartweed (*Polygonum persicaria*) |
|---|---|---|
| 1 | 2,4-D | 11.2 oz./acre. |
| 2 | CMPP | 32.0 plus oz./acre. |
| 3 | CMPP+2,4-D | 12.7 oz./acre. |
| 4 | "A" | 2.2 oz./acre. |

Thus, the 2.2 oz. of composition A applied per acre used in treatment number four actually contained the following amounts of active ingredients:

|  | Oz. |
|---|---|
| 2,4-D | 1.37 |
| CMPP | .34 |
| Banvel D | .49 |

From the above example it will be clear that neither of the ingredients 2,4-D and CMPP alone or in admixture, approaches the weed control efficiency of applicants' composition. It required five times as much 2,4-D acid as compared to the 2,4-D in the applicants' composition to provide equivalent weed control and in addition, the CMPP was completely ineffective even at 32 oz. acid per acre.

EXAMPLE 9

This example is given to further show the applicants' composition can be used to provide complete control of a broad spectrum of weeds.

The composition of this example made up to include MCPA in place of 2,4-D, and contained the following ratio of active ingredients:

|  | Parts |
|---|---|
| CMPP | 1 |
| MCPA | 0.92 |
| Banvel D | 1 |

This was applied on June 10 on a turf fairway. Plots were replicated three times in a randomized block design. Dosages applied included 8 oz. per acre acid equivalent of each ingredient (total 24 oz./acre) in one series. With 16 oz. acid equivalent per acre of each ingredient (total 48 oz./acre) employed in the other three replicates.

Weeds present included dandelion, wild strawberry, white Dutch clover, geranium, pussy's toe, common plantain. Both mixtures gave 100% control in all replicates.

EXAMPLE 10

The following example illustrates the properties of a preferred composition of this invention in controlling wild mustard compared to three of the individual ingredients used alone.

In Table VIII, composition A applied at a rate of 2.2 oz. per acre contained the following amounts of active ingredients:

|  | Oz. |
|---|---|
| 2,4-D | 1.37 |
| 2,4-DP | .34 |
| Banvel D | .49 |

Table VIII (Crop: Wheat)

COMPARISON OF A PREFERRED COMPOSITION ACCORDING TO THIS INVENTION TO THE INDIVIDUAL CONSTITUENTS USED ALONE

[Minimum amount of herbicide needed for 90% kill expressed in terms of amount of active ingredients per acre (acid equivalents)]

| Treatment Number | Composition | Wild Mustard (Brassica arvense) |
|---|---|---|
| 1 | 2,4-D | 4.2 oz./acre. |
| 2 | 2,4-DP | 5.2 oz./acre. |
| 3 | Banvel D | 21.4 oz./acre. |
| 4 | "A" | 2.2 oz./acre. |

It is obvious that the individual ingredients used alone are not effective in controlling the wild mustard weeds, at the same comparative rates of the ingredients in applicants' composition A.

EXAMPLE 11

This example is similar to Example 10, but, illustrates the results in using applicants' composition in controlling red root pigweed in a wheat crop.

Composition G applied at 4.5 oz. of active ingredients per acre contains the following amounts of ingredients:

|  | Oz. |
|---|---|
| 2,4-D | 2.8 |
| 2,4-DP | .7 |
| Banvel D | 1.0 |

Table IX (Crop: Wheat)

COMPARISON OF A PREFERRED COMPOSITION ACCORDING TO THIS INVENTION TO THE INDIVIDUAL CONSTITUENTS USED ALONE

[Minimum amount of herbicide needed for 90% kill expressed in terms of amount of active ingredients per acre (acid equivalents)]

| Treatment Number | Composition | Red Root Pigweed (Amaranthus retroflexus) |
|---|---|---|
| 1 | 2,4-D | 10.2 oz./acre. |
| 2 | 2,4-DP | 12.8 oz./acre. |
| 3 | Banvel D | 3.0 oz./acre. |
| 4 | "G" | 4.5 oz./acre. |

Again, it will be seen that the use of a composition embraced within the scope of this invention gives extremely desirable results.

EXAMPLE 12

The following example is to show a further composition within the scope of this invention, suitable for treating flax crops. Split plots of flax were seeded on sandy loam soil and sprayed at the two growth stages shown below on June 7 and June 17.

Composition H applied at a rate of 8 oz. of active ingredients per acre amounted to the following amounts of active ingredients:

|  | Oz. |
|---|---|
| Banvel D | 1.8 |
| MCPA | 5.0 |
| CMPP | 1.2 |

Herbicides, rates and stages of growth and yield are given in the table which follows.

Table X

| Composition | Yield, Bu. per Acre | | |
|---|---|---|---|
|  | 5 leaf | 10 leaf | Mean |
| Check | 17.6 | 17.2 | 17.4 |
| 2 oz. Banvel D/acre | 18.0 | 16.5 | 17.2 |
| 6 oz. Banvel D/acre | 18.3 | 15.5 | 16.9 |
| 10 oz. MCPA amine/acre | 17.2 | 19.5 | 18.4 |
| "H" | 19.1 | 19.0 | 19.1 |

The above table shows that the applicants' formulation with MCPA instead of 2,4-D gave the best yield without crop injury.

It will be understood that the above examples are only intended to be illustrative and not limitative of the scope of this invention.

It will be further understood to those skilled in this art that where the applicants have mentioned a composition containing the active ingredients, that such a composition is formulated with a diluent such as those previously mentioned.

We claim:

1. A herbicidal composition, including as essential active constituents, a first ingredient comprising a chlorophenoxyacetic herbicide selected from the group consisting of 2,4-dichlorophenoxyacetic acid, esters, amines and herbicidally effective salts thereof and 2-methyl-4-chlorophenoxyacetice acid, esters, amines and herbicidally effective salts thereof, a second ingredient comprising a chlorophenoxypropionic herbicide selected from the group consisting of 2-methyl-4-chlorophenoxypropionic acid, esters, amines and herbicidally effective salts thereof, and 2,4-dichlorophenoxypropionic acid, esters, amines and herbicidally effective salts thereof, and a third ingredient comprising a methoxychlorobenzoic herbicide selected from the group consisting of 2-methoxy-3,6-dichlorobenzoic acid, esters, amines and herbicidally effective salts thereof, the total amount of the chlorophenoxyacetic and chlorophenoxypropionic herbicides together being present in a weight ratio to the methoxy chlorobenzoic herbicide of between about 15:1 and about 1:1; the chlorophenxyacetic herbicide being present in a weight ratio to the chlorophenoxypropionic herbicide of between about ¼:1 to about 4:1, each of the ratios being calculated on the basis of the active ingredients.

2. A herbicidal composition, comprising as the active constituents, a chlorophenoxyacetice herbicide selected from the group consisting of 2,4-dichlorophenoxyacetic acid, esters, amines and herbicidally effective salts thereof, a chlorophenoxypropionic herbicide selected from the group consisting of 2-methyl-4-chlorophenoxypropionic acid, esters, amines and herbicidally effective salts thereof and a methoxychlorobenzoic herbicide selected from the group consisting of 2-methoxy-3,6-dichlorobenzoic acid, esters, amines and herbicidally effective salts thereof, said chlorophenoxyacetic and chlorophenoxypropionic herbicide being present in a combined weight ratio to the methoxychlorobenzoic herbicide of between about 15:1 and about 1:1, the chlorophenoxyacetic herbicide being present in a weight ratio to the chlorophenoxypropionic herbicide of between about ¼:1 to about 4:1, each of the ratios being calculated on the basis of the active ingredients.

3. A herbicidal composition, comprising as the active constituents, a chlorophenoxyacetic herbicide selected from the group consisting of 2,4-dichlorophenoxyacetic acid, esters, amines and herbicidally effective salts thereof, a chlorophenoxypropionic herbicide selected from the group consisting of 2,4-dichlorophenoxypropionic acid, esters, amines and herbicidally effective salts thereof and a methoxychlorobenzoic herbicide selected from the group consisting of 2-methoxy-3,6-dichlorobenzoic acid, esters, amines and herbicidally effective salts thereof, said chlorophenoxyacetic and chlorophenoxypropionic herbicides being present in a combined weight ratio to the methoxychlorobenzoic herbicides of between about 15:1 and about 1:1, the chlorophenoxyacetic herbicide being present in a weight ratio to the chlorophenoxypropionic herbicide of between about ¼:1 to about 4:1, each of the ratios being calculated on the basis of the active ingredients.

4. A herbicidal composition, comprising as the active constituents, a chlorophenoxyacetic herbicide selected from the group consisting of 2-methyl-4-chlorophenoxyacetic acid, esters, amines and herbicidally effective salts thereof, a chlorophenoxypropionic herbicide selected from the group consisting of 2-methyl-4-chlorophenoxypropionic acid, esters, amines and herbicidally effective salts thereof and a methoxychlorozenzoic herbicide selected from the group consisting of 2-methoxy-3,6-dichlorobenzoic acid, esters, amines and herbicidally effective salts thereof, said chlorophenoxyacetic and chlorophenoxypropionic herbicides being present in a combined weight ratio to the methoxychlorobenzoic herbicide of between about 15:1 and about 1:1, the chlorophenoxyacetic herbicide being present in a weight ratio to the chlorophenoxypropionic herbicide of between about ¼:1 to about 4:1, each of the ratios being calculated on the basis of the active ingredients.

5. A herbicidal composition, as defined in claim 1, including therein a diluent.

6. A herbicidal composition, as defined in claim 2, including therein a diluent.

7. A herbicidal composition, as defined in claim 3, including therein a diluent.

8. A herbicidal composition, as defined in claim 4, including therein a diluent.

9. A herbicidal composition, as defined in claim 1, wherein the combined weight ratio of the chlorophenoxyacetic and chlorophenoxypropionic compounds to the methoxychlorobenzoic compound is from between about 9:1 and about 1:1.

10. A method of destroying undesired vegetation which comprises applying to the locus to be treated a phytotoxic amount of a herbicidal composition, including as essential active constituents, a first ingredient comprising a chlorophenoxyacetic herbicide selected from the group consisting of 2,4-dichlorophenoxyacetic acid, esters, amines and herbicidally effective salts thereof and 2-methyl-4-chlorophenoxyacetic acid, esters, amines and herbicidally effective salts thereof, a second ingredient comprising a chlorophenoxypropionic herbicide selected from the group consisting of 2-methyl-4-chlorophenoxypropionic acid, esters, amines and herbicidally effective salts thereof and 2,4-dichlorophenoxypropionic acid, esters, amines and herbicidally effective salts thereof, and a third ingredient comprising a methoxychlorobenzoic herbicide selected from the group consisting of 2-methoxy-3,6-dichlorobenzoic acid, esters, amines and herbicidally effective salts thereof, the total amount of the chlorophenoxyacetic and chlorophenoxypropionic herbicides together being present in a weight ratio to the methoxychlorobenzoic herbicide of between about 15:1 and about 1:1; the chlorophenoxyacetic herbicide being present in a weight ratio to the chlorophenoxypropionic herbicide of between about ¼:1 to about 4:1, each of the ratios being calculated on the basis of the active ingredients.

11. A method of destroying undesired vegetation which comprises applying to the locus to be treated a herbicidal composition including as the essential active constituents, a chlorophenoxyacetic herbicide selected from the group consisting of 2,4-dichlorophenoxyacetic acid, esters, amines and herbicidally effective salts thereof, a chlorophenoxypropionic herbicide selected from the group consisting of 2-methyl-4-chlorophenoxypropionic acid, esters, amines and herbicidally effective salts thereof and a methoxychlorobenzoic herbicide selected from the group consisting of 2-methoxy-3,6-dichlorobenzoic acid, esters, amines and herbicidally effective salts thereof, said chlorophenoxyacetic and chlorophenoxypropionic herbicides being present in a combined weight ratio to the methoxychlorobenzoic herbicide of between about 15:1 and about 1:1, the chlorophenoxyacetic herbicide being present in a weight ratio to the chlorophenoxypropionic herbicide of between about ¼:1 to about 4:1, each of the ratios being calculated on the basis of the active ingredients, said composition being applied to said locus at a rate of from between about 2 to about 32 oz. of active ingredients per acre.

12. A method of destroying undesired vegetation which comprises applying to the locus to be treated a herbicidal composition including as the essential active constituents, a chlorophenoxyacetic herbicide selected from the group consisting of 2,4-dichlorophenoxyacetic acid, esters, amines and herbicidally effective salts thereof, a chlorophenoxypropionic herbicide selected from the group consisting of 2,4-dichlorophenoxypropionic acid, esters, amines and herbicidally effective salts thereof and a methoxychlorobenzoic herbicide selected from the group consisting of 2-methoxy-3,6-dichlorobenzoic acid, esters, amines and herbicidally effective salts thereof, said chlorophenoxyacetic and chlorophenoxypropionic herbicides being present in a combined weight ratio to the methoxychlorobenzoic herbicide of between about 15:1 and about 1:1, the chlorophenoxyacetic herbicide being present in a weight ratio to the chlorophenoxypropionic herbicide of between about ¼:1, to about 4:1, each of the ratios being calculated on the basis of the active ingredients, said composition being applied to said locus at a rate of from between about 2 to about 32 oz. of active ingredients per acre.

13. A method of destroying undesired vegetation which comprises applying to the locus to be treated a herbicidal composition including as the essential active constituents, a chlorophenoxyacetic herbicide selected from the group consisting of 2-methyl-4-chlorophenoxyacetic acid, esters, amines and herbicidally effective salts thereof, a chlorophenoxypropionic herbicide selected from the group consisting of 2-methyl-4-chlorophenoxypropionic acid, esters, amines and herbicidally effective salts thereof and a methoxychlorobenzoic herbicide selected from the group consisting of 2-methoxy-3,6-dichlorobenzoic acid, esters, amines and herbicidally effective salts thereof, said chlorophenoxyacetic and chlorophenoxypropionic herbicides being present in a combined weight ratio to the methoxychlorobenzoic herbicide of between about 15:1 and about 1:1, the chlorophenoxyacetic herbicide being present in a weight ratio to the chlorophenoxypropionic herbicide of between about ¼:1 to about 4:1, each of the ratios being calculated on the basis of the active ingredients, said composition being applied to said locus at a rate of from between about 2 to about 32 oz. of active ingredients per acre.

14. A method, as defined in claim 10, wherein said composition is applied to the locus to be treated in a phytotoxic amount together with a diluent.

15. A method, as defined in claim 11, wherein said composition is applied to the locus to be treated in a phytotoxic amount together with a diluent.

16. A method, as defined in claim 12, wherein said composition is applied to the locus to be treated in a phytotoxic amount together with a diluent.

17. A method, as defined in claim 13, wherein said composition is applied to the locus to be treated in a phytotoxic amount together with a diluent.

18. A method, as defined in claim 11, wherein said composition is applied to the locus to be treated in a phytotoxic amount, and the combined weight ratio of active chlorophenoxyacetic and chlorophenoxypropionic compounds to active methoxychlorobenzoic compound in the composition is from between about 9:1 and about 1:1.

(References on following page)

References Cited by the Examiner

UNITED STATES PATENTS

| | | | |
|---|---|---|---|
| 2,577,969 | 12/1951 | Jones | 71—2.6 |
| 2,992,913 | 7/1961 | Pfeiffer | 71—2.6 |
| 3,013,054 | 12/1961 | Richter | 71—2.6 X |
| 3,151,970 | 10/1964 | Lush et al. | 71—2.6 |

FOREIGN PATENTS 873,218   7/1961   Great Britain.

LEWIS GOTTS, *Primary Examiner.*
JAMES O. THOMAS, Jr., *Examiner.*
A. J. ADAMCIK, *Assistant Examiner.*